(12) United States Patent
Rana et al.

(10) Patent No.: US 8,996,493 B2
(45) Date of Patent: *Mar. 31, 2015

(54) SYSTEM, METHOD AND COMPUTER PROGRAM PRODUCT FOR STORING REPORTS FOR USE BY TENANTS OF A MULTI-TENANT ON-DEMAND DATABASE SERVICE

(71) Applicant: salesforce.com, inc., San Francisco, CA (US)

(72) Inventors: Neelav Rana, San Francisco, CA (US); Peter S. Wisnovsky, Oakland, CA (US); Thomas Kim, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/797,847

(22) Filed: Mar. 12, 2013

(65) Prior Publication Data

US 2013/0191422 A1 Jul. 25, 2013

Related U.S. Application Data

(63) Continuation of application No. 12/557,412, filed on Sep. 10, 2009, now Pat. No. 8,423,524.

(60) Provisional application No. 61/096,554, filed on Sep. 12, 2008.

(51) Int. Cl.
*G06F 17/30* (2006.01)
*G06Q 10/10* (2012.01)
*G06Q 50/16* (2012.01)

(52) U.S. Cl.
CPC .... *G06F 17/30312* (2013.01); *G06F 17/30286* (2013.01); *G06Q 10/10* (2013.01); *G06Q 50/16* (2013.01)
USPC .......................................................... 707/705

(58) Field of Classification Search
CPC ................... G06F 17/30398; G06F 17/30554; G06F 17/30867; G06F 17/30902; G06F 17/30474; G06F 17/30312
USPC .................................................. 707/694, 705
See application file for complete search history.

(56) References Cited

U.S. PATENT DOCUMENTS

| | | | |
|---|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Thu-Nguyet Le
(74) *Attorney, Agent, or Firm* — Zilka-Kotab, PC (57) ABSTRACT

In accordance with embodiments, there are provided mechanisms and methods for storing reports for use by tenants of a multi-tenant on-demand database service. These mechanisms and methods for storing reports for use by tenants of a multi-tenant on-demand database service may allow tenants of the multi-tenant on-demand database service to create, modify, etc. reports programmatically, as desired, and may allow the multi-tenant on-demand database service to make the reports accessible to other tenants of the multi-tenant on-demand database service.

22 Claims, 6 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0020237 A1* | 9/2001 | Yarnall et al. ............ 707/4 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0065986 A1* | 4/2003 | Fraenkel et al. ............ 714/47 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0135611 A1* | 7/2003 | Kemp et al. ............ 709/224 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0168115 A1* | 8/2004 | Bauernschmidt et al. ..... 715/500 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2013/0218948 A1 | 8/2013 | Jakobson |
| 2013/0218949 A1 | 8/2013 | Jakobson |
| 2013/0218966 A1 | 8/2013 | Jakobson |

\* cited by examiner

Advanced Filters

| Field | Operator | Value |
|---|---|---|
| 1. Amount | greater than | 234.89 |
| 2. Age | equals | 18,19,20 |
| 3. Created Alias | contains | thom,pete,joe |
| 4. Last Activity | less or equal | 5/19/2007 |
| 5. Forecast Category | equals | Pipeline,Best Case,Co |

Add Row  Remove Row

Clear Advanced Options
Advanced Filter Conditions:
(not (1 or 2) and (3 or 4)) or 5

Example: If you wanted to filter to key deals for your company, where key deals are deals over $1,000,000 that are closing in the next 45 days, or deals owned by a VP, you would set up your filters as follows

Advanced Filters:

| Field | Operator | Value |
|---|---|---|
| 1. Amount | greater than | 1000000 |
| 2. Closed Date | equals | NEXT 45 DAYS |
| 3. Owner Role | starts with | VP |
| 4. --None-- | equa... | |
| 5. | equals | |

Advanced Filter Conditions:
(1 AND 2) OR 3

Filter Language
English

Select a filter language when using "starts with" or "contains" operators.

ALL OPPORTUNITIES

Amount = $1M

Close Date = next 45 days

Deals owned by a VP 1 and 2 → 3

RESULT

Tips

Step 2: Select the grouping for which you would like to calculate summary information      Step 2 of 7

Select columns by which to group your report.      Jump to Step [Select Grouping ▽] [Next]

1. Specify your Row Headings:

Select the fields that will be used as the summary rows in your matrix report

| | Subtotal By | Sort Order | Group Dates By |
|---|---|---|---|
| | [Close Date ▽] | [Ascending ▽] | [Fiscal Quarter ▽] |
| | and then by | Sort Order | Group Dates By |
| | [Industry ▽] | [Ascending ▽] | [Day ▽] |

2. Specify your Column Headings:

Select the fields that will be used as the summary columns in your matrix report

| | Subtotal By | Sort Order | Group Dates By |
|---|---|---|---|
| | [Owner Role ▽] | [Ascending ▽] | [Day ▽] |
| | and then by | Sort Order | Group Dates By |
| | [Salesforce Owner ▽] | [Ascending ▽] | [Day ▽] |

[Run Report] [Export Details] [Printable View] [Save As]      [Cancel] [Next]

SYSTEM, METHOD AND COMPUTER PROGRAM PRODUCT FOR STORING REPORTS FOR USE BY TENANTS OF A MULTI-TENANT ON-DEMAND DATABASE SERVICE

CLAIM OF PRIORITY

This application is a continuation of U.S. application Ser. No. 12/557,412, filed Sep. 10, 2009, which claims the benefit of U.S. Provisional Patent Application No. 61/096,554, filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to reports, and more particularly to storing reports.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, reports have generally been stored in such databases utilizing proprietary formats. Unfortunately, various limitations exist as a result of storing reports in a proprietary format. In many cases, reports have been stored utilizing a format proprietary to the service providing the database. Thus, developers without a specialized knowledge of development in the proprietary format (e.g. developers external to a provider of the database system) are oftentimes required to utilize a preconfigured user interface of the database service for creating a report in the proprietary format.

In other cases, reports have been stored utilizing a format proprietary to the developer creating the reports. Thus, reports in a format that is proprietary to a specific developer have generally been incapable of being shared, distributed, etc. across other entities (e.g. users, organizations, etc.).

BRIEF SUMMARY

In accordance with embodiments, there are provided mechanisms and methods for storing reports for use by tenants of a multi-tenant on-demand database service. These mechanisms and methods for storing reports for use by tenants of a multi-tenant on-demand database service may allow tenants of the multi-tenant on-demand database service to create, modify, etc. reports programmatically, as desired, and may allow the multi-tenant on-demand database service to make the reports accessible to other tenants of the multi-tenant on-demand database service.

In an embodiment and by way of example, a method is provided for storing reports for use by tenants of a multi-tenant on-demand database service. In use, a report is received from a first tenant of a multi-tenant on-demand database service. Further, the report is stored for use by at least one second tenant of the multi-tenant on-demand database service.

While the present invention is described with reference to an embodiment in which techniques storing reports for use by tenants of a multi-tenant on-demand database service are implemented in an application server providing a front end for the multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for storing reports for use by tenants of a multi-tenant on-demand database service.

To date, conventional database systems have required reports to be stored in such databases utilizing proprietary formats. Unfortunately, various limitations exist as a result of storing reports in a proprietary format. Thus, mechanisms and methods are provided herein for storing reports for use by tenants of a multi-tenant on-demand database service to allow tenants of the multi-tenant on-demand database service to create, modify, etc. reports programmatically, as desired, and to allow the multi-tenant on-demand database service to make the reports accessible to other tenants of the multi-tenant on-demand database service.

Next, mechanisms and methods for storing reports for use by tenants of a multi-tenant on-demand database service will be described with reference to exemplary embodiments.

Figure 1:
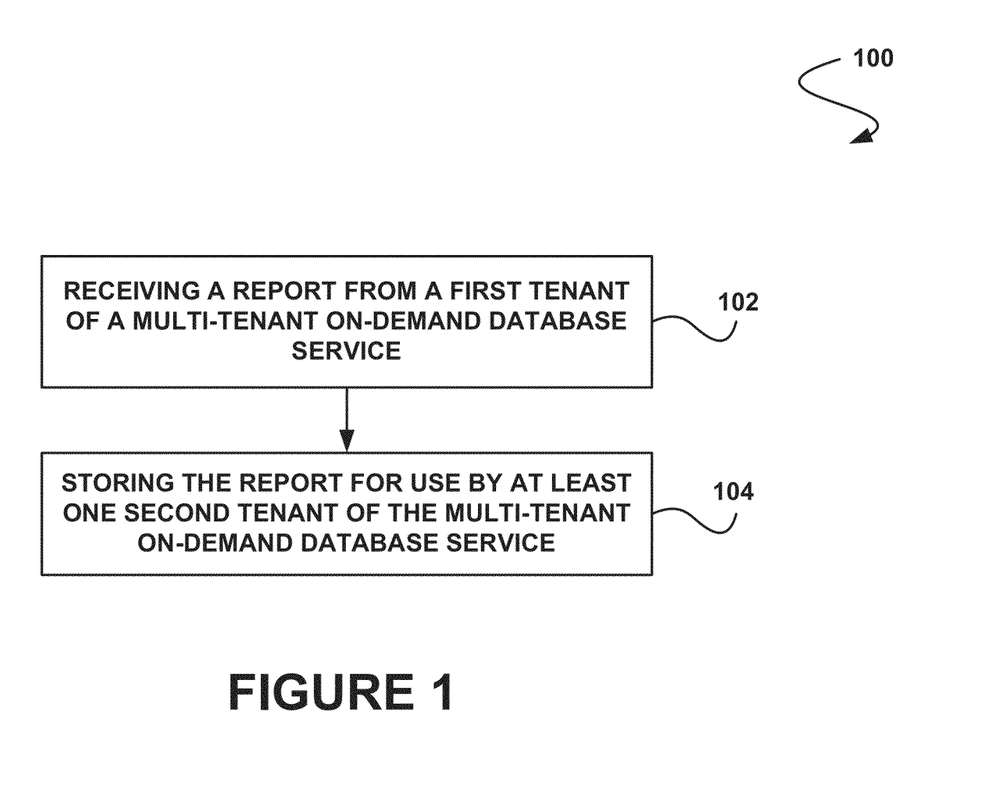
FIG. 1 shows a method for storing reports for use by tenants of a multi-tenant on-demand database service, in accordance with one embodiment.

FIG. 1 shows a method 100 for storing reports for use by tenants of a multi-tenant on-demand database service, in accordance with one embodiment. As shown, a report is received from a first tenant of a multi-tenant on-demand database service. See operation 102.

In the context of the present description, the report may include an accounting, summarization, representation, evaluation, etc. of any type of data that is capable of being received from the first tenant of the multi-tenant on-demand database service. For example, the report may summarize financial information, product and/or service information, entity (e.g. user, organization, etc.) information, etc. In one exemplary embodiment, the report may include a table (e.g. of columns and rows defining a plurality of cells). It should be noted that the report may be of a predetermined type (e.g. defined based on a predetermined template) or may be entirely customized.

Additionally, the report may include a plurality of portions (e.g. attributes), for example, defined by the first tenant of the multi-tenant on-demand database service. Thus, report may be created by the first tenant of the multi-tenant on-demand database service based on the defined portions.

In one embodiment, the portions of the report may include columns (e.g. displayed in the report). For example, the report may include a table and the columns may include columns of the table. As another example, the columns may each be defined (e.g. by the first tenant) to include a different type of data. As yet another example, the columns may define an ordering associated with the report.

In another embodiment, the portions of the report may include filters (e.g. applied to data being reported via the report). Each filter may optionally be defined by a filter item. For example, the filter item may include an identifier of a column to which the filter is applied, an operator, and a value against which the column is applied based on the operator.

In yet another embodiment, the portions of the report may include a scope of data reported via the report. For example, the scope may indicate a subset of data being reported via the report (to which the filters are applied, etc.). The subset of data may include a subset of data in a particular database (e.g. of the multi-tenant on-demand database service), such as data for a particular tenant of the multi-tenant on-demand database service, data for a particular account of a particular tenant of the multi-tenant on-demand database service, etc.

In still yet another embodiment, the portions of the report may include formulas. The formulas may each apply at least one function to data, such that a result of the application of the function to the data may be included in the report. For example, the formulas may apply mathematical operations (e.g. sum, etc.) to data.

In a further embodiment, the portions of the report may include groupings. The groupings may each include a group of rows and/or columns of data to include in the report (e.g. summarized in the report, etc.). For example, a summarization of data indicated by the grouping may be provided in the report.

In another embodiment, the portions of the report may include parameters. The parameters may be specific to the report. Just by way of example, the parameters may include a set of values specific to the report. As another example, the parameters may be associated with specific options, user interface elements, etc. that are available for modifying the report.

The portions of the report may also include color ranges. The color ranges may each indicate a color coding of data (e.g. cells, etc.) of the report. For example, a plurality of ranges may each be specified with a different color, such that data in the report that is within one of the ranges may be color coded according to the color specified for that range.

It should be noted that the portions of the report may be defined by the first tenant of the multi-tenant on-demand database service in any desired manner. As an option, the portions of the report may be defined by the first tenant utilizing a user interface [e.g. a graphical user interface (GUI)] of the multi-tenant on-demand database service. The user interface may include various options (e.g. fields, etc.) for allowing the first tenant to configure columns, filters, parameters, etc. of the report.

As another option, the portions of the report may be defined programmatically (e.g. without use of the user interface of the metadata schema may include) by the first tenant utilizing a metadata schema. The metadata schema may include a human-readable schema (e.g. non-encoded, etc.). Just by way of example, the metadata schema may include an extensible markup language (XML) schema.

As noted above, the report is received from the first tenant of the multi-tenant on-demand database service. In the present description, such multi-tenant on-demand database service may include any service that relies on a database system that is accessible over a network, in which various elements of hardware and software of the database system may be shared by one or more tenants (e.g. customers, organizations, groups, users, etc.). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

In one embodiment, the report may be received by the multi-tenant on-demand database service. For example, the report may be received by the multi-tenant on-demand database service utilizing an application program interface (API) of the multi-tenant on-demand database service. Optionally, the report may be received over a network from a device (e.g. computer, etc.) of the first tenant. As another option, the report may be received in association with a request from the first tenant to store the report.

Furthermore, as shown in operation 104, the report is stored for use by at least one second tenant of the multi-tenant on-demand database service. In one embodiment, the second tenant may include a tenant of the multi-tenant on-demand database service that is different than the first tenant of the multi-tenant on-demand database service. To this end, the report may be received from the first tenant and stored for use (e.g. viewing, modifying, purchasing, etc.) thereof by any other tenant(s) of the multi-tenant on-demand database service.

In one embodiment, the report may be stored in a database of the multi-tenant on-demand database service. Accordingly, the second tenant may access the report for use thereof via an API of the multi-tenant on-demand database service. Of course, however, the report may be stored in any desired location which allows use thereof by the second tenant of the multi-tenant on-demand database service.

Moreover, the report may be stored in any desired format which allows use thereof by the second tenant of the multi-tenant on-demand database service. For example, the report may be stored in a format accessible to the first tenant and the second tenant. Thus, the report may be stored in a format that is non-proprietary with respect to the tenants of the multi-tenant on-demand database service and the multi-tenant on-demand database service itself.

As an option, the report may be stored utilizing the metadata schema described above with respect to operation 102. For example, the report may be defined by the first tenant utilizing the metadata schema, and the report may be stored in such metadata schema format. The metadata schema may include a schema that is usable (e.g. readable, non-proprietary, etc.) by the second tenant of the multi-tenant on-demand database service, such that the report may be stored in a format usable by other tenants of the multi-tenant on-demand database service.

As another example, the report may be defined by the first tenant utilizing the user interface of the multi-tenant on-demand database service (described above). Further, the report may be converted from a format associated with the user interface to the metadata schema for storage of the report in the metadata schema format. In this way, the report may be stored in a format usable by other tenants of the multi-tenant on-demand database service even when the report is defined utilizing a user interface of the multi-tenant on-demand database service.

Figure 2:
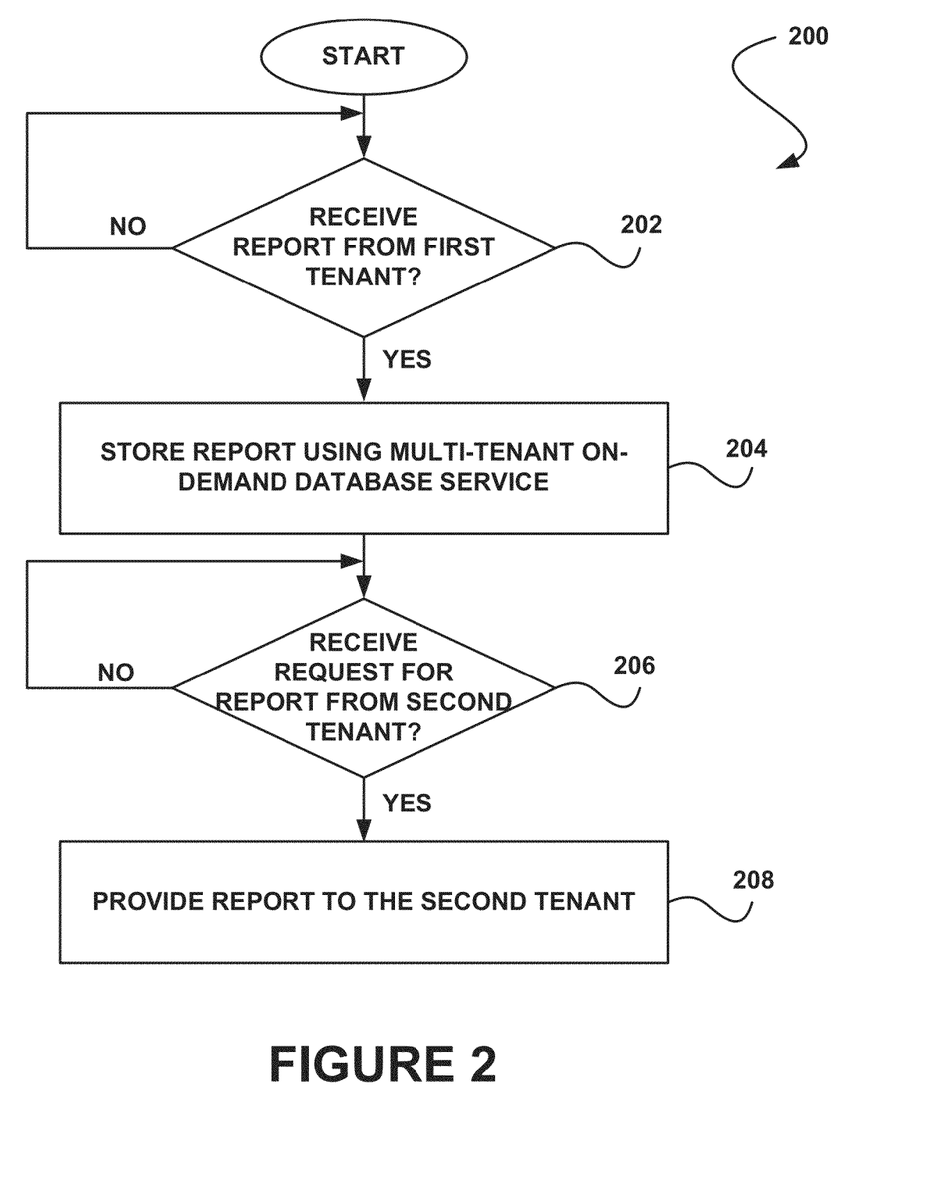
FIG. 2 shows a method for provisioning reports stored using a multi-tenant on-demand database service to tenants of the multi-tenant on-demand database service, in accordance with another embodiment.

FIG. 2 shows a method 200 for provisioning reports stored using a multi-tenant on-demand database service to tenants of the multi-tenant on-demand database service, in accordance with another embodiment. As an option, the present method 200 may be carried out in the context of the functionality of FIG. 1. For example, the method 200 may be carried out by the multi-tenant on-demand database service. Of course, however, the method 200 may be carried out in any desired environment. The aforementioned definitions may apply during the present description.

As shown in decision 202, it is determined whether a report is received from a first tenant of a multi-tenant on-demand database service. In one embodiment, the determination may include determining whether a report has been received by an API of the multi-tenant on-demand database service. In another embodiment, the determination may include determining whether a request to store the report, where the request includes the report, has been received from the first tenant (e.g. at the API of the multi-tenant on-demand database service). If it is determined that the report is not received, the method 200 continues to wait for a report to be received from the first tenant.

With respect to the description of the present embodiment, the report may be defined (e.g. created) by the first tenant. For example, the first tenant may define the report by defining various portions of the report. The portions may include a type of the report, columns of the report, etc., as described below.

In one embodiment, a type of the report may be defined. The type of the report may include one of a plurality of predefined types (e.g. report templates, etc.), for example. As an option, the type may indicate information that is available for use in defining the report, such as objects available to the report (e.g. which subset of data may be reported via the report, columns available to be reported, parameters that may be used in the report, etc.), columns from the objects that are available to the report, parameters that are available to the report, etc. Of course, in another embodiment, the type of the report may not necessarily be defined such that the report may be entirely customized (e.g. configured) by the first tenant.

Optionally, a description of the predefined types of reports may be provided to the first tenant via a describe API of the multi-tenant on-demand database service. The describe API may present to the first tenant the information that is available for use in defining the report. For example, a web service definition language method may enumerate the various report types (including predefined types and an entirely customized type) and may describe the information that is available for use in defining each different type of report.

In another embodiment, a format of the report may be defined. The format may indicate whether the report is tabular, a summary, a matrix, etc. Additionally, the format may restrict the manner in which other portions of the report may be defined. Just by way of example, only a tabular report can specify a top predetermined number of options. As another example, only summary and matrix reports may specify groupings and/or formulas (describe in more detail below).

In yet another embodiment, a scope of the report may be defined. The scope may indicate the data that is available for reporting via the report. For example, the scope may indicate a subset of data being reported via the report. The subset of data may include a subset of data in a particular database (e.g. of the multi-tenant on-demand database service), such as data for a particular tenant of the multi-tenant on-demand database service, data for a particular account of a particular tenant of the multi-tenant on-demand database service, etc.

In still yet another embodiment, columns of the report may be defined. The columns may include those displayed via the report. As an option, the columns may define an ordering.

In a further embodiment, filters used in the report may be defined. The defined filters may include those applied to data being reported via the report. Optionally, each filter may be defined by a filter item including an identifier of a column to which the filter is applied, an operator, and a value against which the column is applied based on the operator. Multiple filter items may be defined for the report, in one embodiment. In such embodiment, the multiple filter items may be ordered (based on the order in which the filter items are entered by the first tenant), for identifying a sequence in which the filter items are applied to data being reported via the report.

In another embodiment, groupings may be defined for the report. The groupings may be used to group columns and/or rows being reported via the report. Just by way of example, date groupings may be used to group date columns. Optionally, the date grouping may allow a truncation level for the date (e.g. day, month, year, fiscal options which vary based whether the fiscal years utilized are standard or custom, etc.). As another option, the groupings may be ordered in the report.

Formulas for the report may also be defined, in one embodiment. The formulas may each apply at least one function to data (e.g. data being reported via the report), such that a result of the application of the function to the data may be included in the report. For example, the formulas may apply mathematical operations (e.g. sum, etc.) to data. In this way, the formulas may summarize the data based on operations in the formula (e.g. summing, etc.). Optionally, the formulas may only be utilized with respect to summary and/or matrix reports.

In yet another embodiment, parameters for the report may be defined. The parameters (e.g. name/value pairs) may be specific to the type of report defined by the first tenant, as described above. Just by way of example, the parameters may include a set of values specific to the report. As another example, the parameters may be associated with specific options, user interface elements, etc. that are available for modifying the report. In one exemplary embodiment, an activities type report may allow the first tenant to specify whether open and/or closed activities, tasks and/or events, etc. are presented via the report.

Color ranges for the report may also be defined, in one embodiment. The color ranges may each indicate a color coding of data (e.g. cells, etc.) of the report. For example, a plurality of ranges may each be specified with a different color, such that data in the report that is within one of the ranges may be color coded according to the color specified for that range. In this way, summary and/or matrix cells that contain aggregate values (e.g. based on an applied formula) within a particular range may be highlighted using a color defined for that range.

As an option, the report may be validated prior to being used by other tenants of the multi-tenant on-demand database service (e.g. at runtime, etc.). Each validation may be common or different with respect to reports defined programmatically and via a user interface of the multi-tenant on-demand database service. For each portion of the report that is not validated, an error may be returned to the first tenant for correcting the invalidated report definition (e.g. only if the report is defined programmatically). As another option, the invalidated portions may be automatically corrected (e.g. only if the report is defined via the user interface).

In one embodiment, the validations may validate the format defined for the report. For example, if a grouping or formula is added to a tabular report via the user interface, the report may be automatically changed to a summary or matrix format, if all groupings are removed from a summary or matrix report, the report may be automatically changed to a tabular format, etc. As another example, errors may be returned to the first tenant if a tabular report has any groupings or formulas defined, if a summary report does not define a grouping, if a matrix report does not define a column grouping and a row grouping, etc.

In another embodiment, the validations may validate the scope defined for the report. For example, different scopes may be available to different types of reports. Thus, the validation may include validating whether the scope defined for the report is available for the defined type of the report.

In yet another embodiment, the validations may validate filters defined for the report. Optionally, a predefined subset of operators may only be available for use for being applied to particular columns of data. Thus, the validation may validate whether an operator included in a formula applied against a particular column is available for use with respect to that column.

In still yet another embodiment, the parameters defined for the report may be validated. For example, parameters may be validated with respect to the defined type of the report (e.g. for validating that the parameters are available for the type of the report). Of course, while various examples of validations have been described above, it should be noted that the report may be validated in any desired manner.

Table 1 shows one example of a report programmatically defined utilizing an XML schema. It should be noted that the report is set forth for illustrative purposes only, and thus should not be construed as limiting in any manner.

TABLE 1

```
<?xml version="1.0" encoding="UTF-8"?>
<CustomReport xmlns="http://soap.sforce.com/2006/04/metadata">
    <chartXAxisColumn>INDUSTRY</chartXAxisColumn>
    <chartYAxisColumn>CLOSE_MONTH</chartYAxisColumn>
    <columns>
```

TABLE 1-continued

```
        <field>FULL_NAME</field>
    </columns>
    <columns>
        <field>OPPORTUNITY_NAME</field>
    </columns>
    <columns>
        <field>TYPE</field>
    </columns>
    <columns>
        <field>AMOUNT</field>
    </columns>
    <filters>
        <column>AGE</column>
        <operator>greaterThan</operator>
        <value>0</value>
    </filters>
    <format>Matrix</format>
    <params>
        <name>quarter</name>
        <value>custom</value>
    </params>
    <params>
        <name>scope<name>
        <value>organization</value>
    </params>
    <params>
        <name>open</name>
        <value>all</value>
    </params>
    <params>
        <name>probability</name>
        <value>>0</value>
    </params>
    <params>
        <name>div_rep</name>
        <value></value>
    </params>
    <reportType>Opportunity</reportType>
    <scope>organization</scope>
    <showDetails>false</showDetails>
    <sortAsc>false</sortAsc>
</CustomReport>
```

As shown in Table 1, the syntax used to define the report uses API names for each defined portion of the report. For example, the <table> tag may identify the table that a field in the report type in the report sits on. Further, the field tag may identify the field on the table that defines the report column. In the present example, both the table and the field may be required to be defined in order to uniquely specify a column. Moreover, it should be noted that a table may appear multiple times in one report type, as well as the fields on that table.

Table 2 illustrates one example of programmatically defined color ranges for a report. Again, it should be noted that the programmatically defined color ranges are set forth for illustrative purposes only, and thus should not be construed as limiting in any manner.

TABLE 2

```
<colorRanges>
    <aggregate>Sum</aggregate>
    <columnName>EXP_AMOUNT</columnName>
    <highBreakpoint>5000.0</highBreakpoint>
    <highColor>
        <blue>84</blue>
        <green>194</green>
        <red>84</red>
    </highColor>
    <lowBreakpoint>100.0</lowBreakpoint>
    <lowColor>
        <blue>0</blue>
        <green>204</green>
        <red>51</red>
    </lowColor>
```

TABLE 2-continued

```
    <midColor>
        <blue>84</blue>
        <green>194</green>
        <red>194</red>
    </midColor>
</colorRanges>
```

As shown in Table 2, if the sum of the EXP_AMOUNT column is higher than 5,000, the cell containing the sum value may be highlighted using a first combination of red, green and blue color values. If the sum is less than 100, the cell containing the sum value may be highlighted using a second combination of red, green and blue color values. If the sum is between 100 and 5,000, the cell containing the sum value may be highlighted using a third combination of red, green and blue color values.

Table 3 illustrates another example of a report programmatically defined utilizing an XML schema. Again, it should be noted that the report is set forth for illustrative purposes only, and thus should not be construed as limiting in any manner.

TABLE 3

```
<?xml version="1.0" encoding="UTF-8"?>
<CustomReport xmlns="http://soap.sforce.com/2006/04/metadata">
    <chartXAxisColumn>INDUSTRY</chartXAxisColumn>
    <chartYAxisColumn>CLOSE_MONTH</chartYAxisColumn>
    <colorRanges>
        <aggregate>Sum</aggregate>
        <columnName>EXP_AMOUNT</columnName>
        <highBreakpoint>5000.0</highBreakpoint>
        <highColor>
            <blue>84</blue>
            <green>194</green>
            <red>84</red>
        </highColor>
        <lowBreakpoint>100.0</lowBreakpoint>
        <lowColor>
            <blue>0</blue>
            <green>204</green>
            <red>51</red>
        </lowColor>
        <midColor>
            <blue>84</blue>
            <grean>194</grean>
            <red>194</red>
        </midColor>
    </colorRanges>
    <columns>
        <field>FULL_NAME</field>
    </columns>
    <columns>
        <field>OPPORTUNITY_NAME</field>
    </columns>
    <columns>
        <field>TYPE</field>
    </columns>
    <columns>
        <field>LEAD_SOURCE</field>
    </columns>
    <columns>
        <field<AMOUNT</field>
    </columns>
    <columns>
        <field>EXP_AMOUNT</field>
    </columns>
    <columns>
        <field>CLOSE_DATE</field>
    </columns>
    <columns>
        <field>NEXT_STEP</field>
    </columns>
    <columns>
        <field>STAGE_NAME</field>
```

TABLE 3-continued

```
    </columns>
    <columns>
        <field>AGE</field>
    </columns>
    <columns>
        <field>ROLLUP_DESCRIPTION</field>
    </columns>
    <columns>
        <field>CREATED_DATE</field>
    </columns>
    <columns>
        <field>ACCOUNT_NAME</field>
    </columns>
    <division>null</division>
    <filters>
        <column>AGE</column>
        <operator>greaterThan</operator>
        <value>0</value>
    </filters>
    <format>Matrix</format>
    <params>
        <name>quarter</name>
        <value>custom</value>
    </params>
    <params>
        <name>scope</name>
        <value>organization</value>
    </params>
    <params>
        <name>open</name>
        <value>all</value>
    </params>
    <params>
        <name>probability</name>
        <value>>0</value>
    </params>
    <params>
        <name>div_rep</name>
        <value></value>
    </params>
```

Further, if it is determined that the report is received, the report is stored using the multi-tenant on-demand database service. See operation 204. For example, the report may be stored in a database of the multi-tenant on-demand database service.

In an embodiment where the report is defined programmatically, the report may be received from a metadata API which interacts directly with a report interface of the multi-tenant on-demand database service. For example, the metadata API may include a deploy method to write the report to the report interface. In an embodiment where the report is defined via the user interface of the multi-tenant on-demand database service, the report may be received from the user interface which interacts directly with the report interface of the multi-tenant on-demand database service. For example, the user interface may include a deploy method (e.g. identical to the deploy method of the metadata API) to write the report to the report interface.

In one embodiment, the report may be stored utilizing a metadata schema that is accessible by each tenant of the multi-tenant on-demand database service. Thus, if the report is defined programmatically in such metadata schema format, then the report may be directly stored without processing. If, however, the report is defined via the user interface, the report may be converted from a format used by the user interface to the metadata schema, such that the report is stored in the metadata schema.

Once the report is stored, it is determined whether a request for the report is received from a second tenant of the multi-tenant on-demand database service. See decision 206. The second tenant may include any tenant that is different from the first tenant. The request may be to view the report, modify the report, purchase the report, etc.

If it is determined that a request for the report is not received from a second tenant of the multi-tenant on-demand database service, the method 200 continues to wait for such a request to be received. If it is determined that a request for the report is received from a second tenant of the multi-tenant on-demand database service, the report is provided to the second tenant. See operation 208. In one embodiment, the report may be provided utilizing a package sent to the second tenant. Of course, however, the report may be provided in any desired manner (e.g. for the second tenant to view the report, modify the report, etc.).

For example, if the report is requested via the metadata API described above (e.g. for viewing programmatically), a retrieve method of the metadata API may read the report from the multi-tenant on-demand database service. If the report is requested via the user interface (e.g. for viewing in the user interface), a retrieve method of the user interface (e.g. identical to the retrieve method of the metadata API) may read the report from the multi-tenant on-demand database service.

If the report is validated at runtime, as described above, the runtime definition of the report may differ from the stored definition of the report. For example, the set of columns available to the second tenant may be based on permissions, etc. which may change over time. Additionally, available fields may also change over time (e.g. may be deleted, etc.). If the report is provided via the user interface, the report is allowed to run without data (e.g. columns) that is unavailable. Thus, for example, if a filter or grouping requires an unavailable column, the report is run without the filter/grouping. In another exemplary embodiment, if a matrix report is grouped by industry and the industry field is not available to the second tenant, the report may be run without the industry grouping and, optionally, the report may be converted into a summary report rather than a matrix report (to eliminate errors resulting from the removal of the industry grouping).

Figure 3:
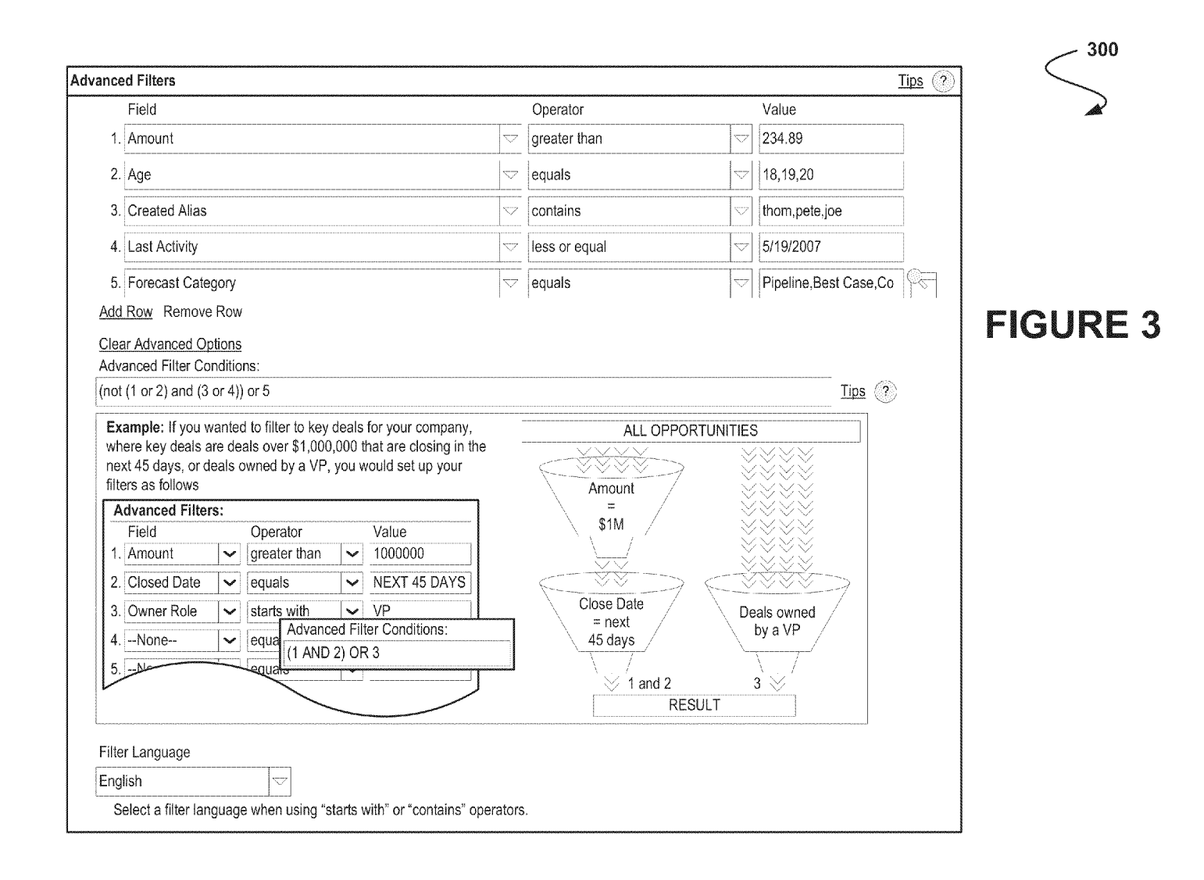
FIG. 3 shows a user interface for configuring filters for a report, in accordance with yet another embodiment.

FIG. 3 shows a user interface 300 for configuring filters for a report, in accordance with yet another embodiment. As an option, the user interface 300 may be implemented in the context of the functionality of FIGS. 1-2. Of course, however, the user interface 300 may be implemented in any desired environment. Again, the aforementioned definitions may apply during the present description.

As shown, the user interface 300 allows a first tenant of a multi-tenant on-demand database service to configure multiple filters for a report. The filters may each be configured via a filter item. The filter item includes a field input field for selecting (e.g. from a drop-down list) a field of a table, an operator field for selecting an operator to be applied to the field of the table, and a value field for specifying a value against which the field is to be applied using the operator. Additionally, Boolean conditions may be defined between the filter items for specifying a manner in which the filters are to be applied.

Figure 4:
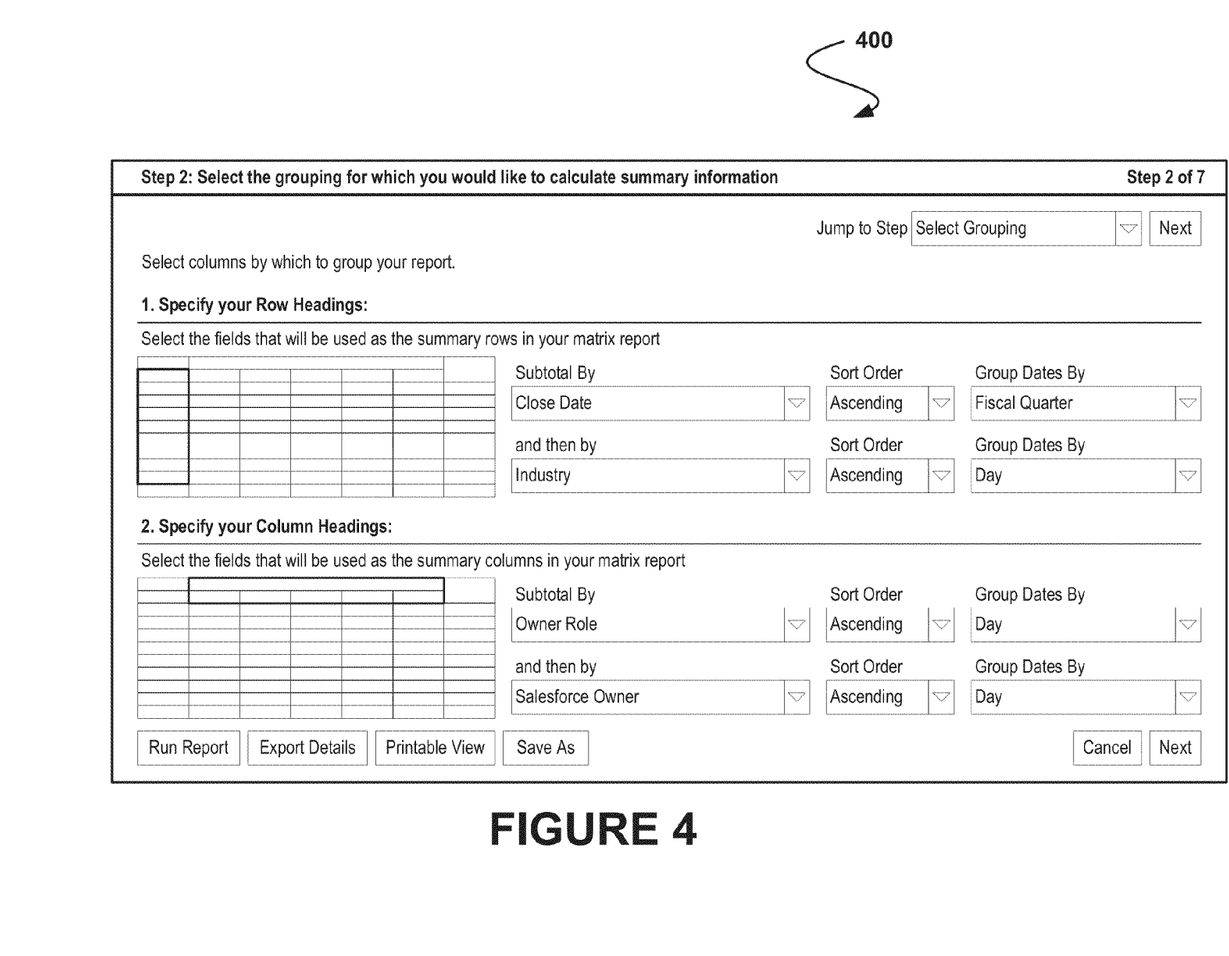
FIG. 4 shows a user interface for grouping reports, in accordance with still yet another embodiment.

FIG. 4 shows a user interface 400 for grouping reports, in accordance with still yet another embodiment. As an option, the user interface 400 may be implemented in the context of the functionality of FIGS. 1-2. Of course, however, the user interface 400 may be implemented in any desired environment. Again, the aforementioned definitions may apply during the present description.

As shown, the user interface 400 allows a first tenant of a multi-tenant on-demand database service to configure groupings for a report. The groupings may be used to group columns and/or rows being reported via the report. Thus, the groupings may group data for being summarized in the report.

System Overview

Figure 5:
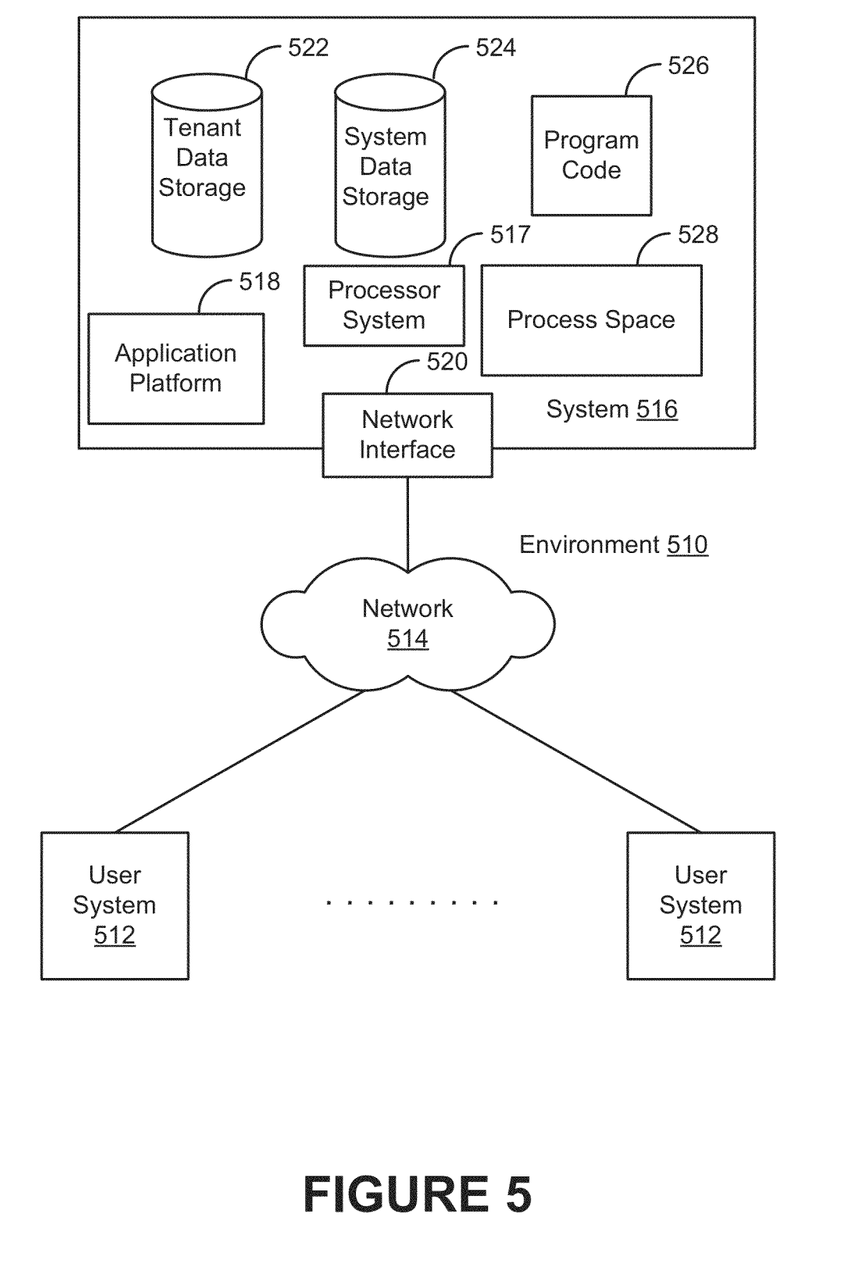
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
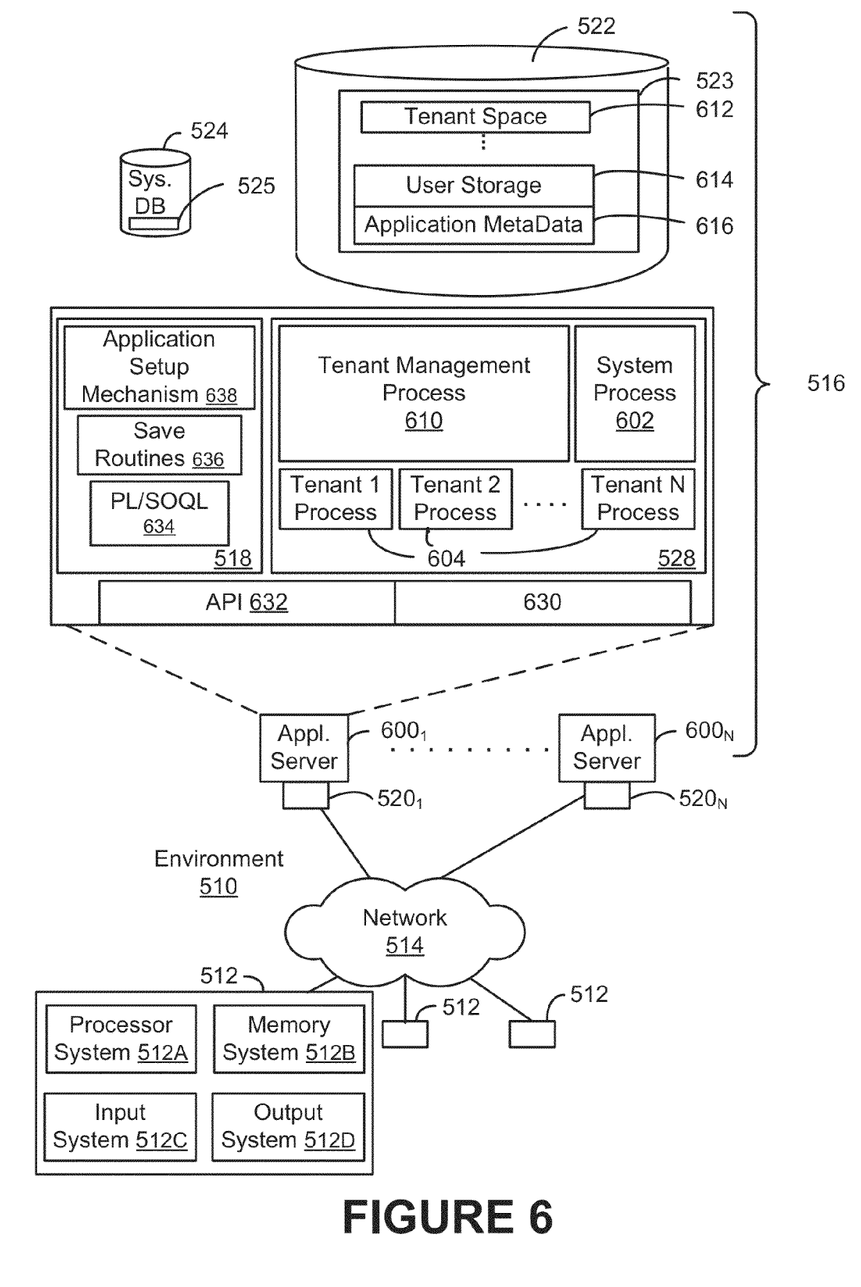
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517 of FIG. 5, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PU/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multitenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; and/or US 2009/0037828 titled "SYSTEM, METHOD AND COMPUTER PROGRAM PRODUCT FOR EDITING AN ON-DEMAND DATABASE SERVICE GRAPHICAL USER INTERFACE," filed Jul. 17, 2008, which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   receiving at a database service a report from a first customer of the database service, the report received from the first customer including:
   a table including a plurality of columns and rows defining a plurality of cells,
   one or more filters each including an identifier of one of the plurality of columns to which the filter is applied, an operator, and a value to be applied against the one of the plurality of columns based on the operator,
   a scope of data indicating a subset of data in a database of the database service to which the one or more filters are applied, and
   one or more mathematical functions to be applied to the subset of data to create results to be included in the report;

validating the one or more filters, the scope of data, and the one or more mathematical functions; and storing the report in a database of the database service in a format usable by at least one second customer of the database service, the database service storing the data for each of the first customer and the at least one second customer in a logically separate manner.

2. The method of claim 1, wherein the report includes a plurality of portions defined by the first customer.

3. The method of claim 2, wherein the portions include the plurality of columns, the one or more filters, one or more formulas, one or more parameters, and one or more color ranges.

4. The method of claim 2, wherein the defined portions include the plurality of columns, the one or more filters, one or more formulas, one or more parameters, and one or more color ranges.

5. The method of claim 2, wherein the portions are defined by the first customer utilizing a user interface of the database service.

6. The method of claim 5, wherein the report is converted from a format associated with the user interface to a metadata schema for storing the report in the metadata schema.

7. The method of claim 2, wherein the portions are defined programmatically by the first customer utilizing a metadata schema.

8. The method of claim 7, wherein the report is stored in the metadata schema.

9. The method of claim 7, wherein the metadata schema includes an extensible markup language (XML) schema.

10. The method of claim 1, wherein the report is received by the database service utilizing an application program interface of the database service.

11. The method of claim 1, wherein the second format is accessible to the first customer and the at least one second customer.

12. The method of claim 1, wherein the at least one second customer is different from the first customer.

13. The method of claim 1, wherein the at least one second customer views the report.

14. The method of claim 1, wherein the at least one second customer modifies the report.

15. The method of claim 1, further comprising receiving a request for the report by the at least one second customer.

16. The method of claim 15, further comprising providing the report to the at least one second customer via an application program interface of the database service.

17. The method of claim 1, wherein the database service includes a database system accessible to the first customer and the at least one second customer over a network, which has hardware and software that is shared by both the first customer and the at least one second customer, which processes requests for the first customer and processes requests for the at least one second customer.

18. The method of claim 1, wherein the scope of the data indicates that data of the at least one second customer in the particular database is being reported via the report.

19. The method of claim 1, wherein in response to a request for the report received by the database service from the at least one second customer, the report is run without data that is unavailable to the at least one second customer as determined by permissions defined for the at least one second customer, such that a runtime definition of the report differs from a stored definition of the report.

20. A computer program product, comprising a non-transitory computer usable medium having a computer readable program code embodied therein, the computer readable program code causing a computer to implement method comprising:

receiving at a database service a report from a first customer of the database service, the report received from the first customer including:
a table including a plurality of columns and rows defining a plurality of cells,
one or more filters each including an identifier of one of the plurality of columns to which the filter is applied, an operator, and a value to be applied against the one of the plurality of columns based on the operator,
a scope of data indicating a subset of data in a database of the database service to which the one or more filters are applied, and
one or more mathematical functions to be applied to the subset of data to create results to be included in the report;

validating the one or more filters, the scope of data, and the one or more mathematical functions; and storing the report in a database of the database service in a format usable by at least one second customer of the database service.

21. An apparatus, comprising:

a processor for:

receiving at a database service a report from a first customer of the database service, the report received from the first customer including:
a table including a plurality of columns and rows defining a plurality of cells,
one or more filters each including an identifier of one of the plurality of columns to which the filter is applied, an operator, and a value to be applied against the one of the plurality of columns based on the operator,
a scope of data indicating a subset of data in a database of the database service to which the one or more filters are applied, and
one or more mathematical functions to be applied to the subset of data to create results to be included in the report;

validating the one or more filters, the scope of data, and the one or more mathematical functions; and storing the report in a database of the database service in a format usable by at least one second customer of the database service.

22. The apparatus of claim 21, wherein the processor is coupled to memory via a bus.

* * * * *